US012792528B2

(12) United States Patent
Balakrishna et al.

(10) Patent No.: US 12,792,528 B2
(45) Date of Patent: Nov. 10, 2026

(54) MANAGEMENT AND RECOVERY OF DATA PROCESSING SYSTEM PERIPHERAL DEVICES

(71) Applicant: Dell Products L.P., Round Rock, TX (US)

(72) Inventors: Sandesh Hadhimane Balakrishna, Bangalore (IN); Shiva Kumar Samshetty, Bangalore (IN); Deepaganesh Paulraj, Bangalore (IN); Ajay Kumar Yadav, Bangalore (IN); Ajeesh Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,437

(22) Filed: Jul. 26, 2024

(65) Prior Publication Data

US 2026/0030180 A1 Jan. 29, 2026

(51) Int. Cl.
*G06F 13/12* (2006.01)

(52) U.S. Cl.
CPC .......... *G06F 13/12* (2013.01); *G06F 2213/40* (2013.01)

(58) Field of Classification Search
CPC ............................. G06F 13/12; G06F 2213/40
See application file for complete search history.

(56) References Cited

U.S. PATENT DOCUMENTS 5,339,404 A 8/1994 Vandling, III
5,740,429 A 4/1998 Wang
7,024,567 B2 4/2006 Kim
7,418,545 B2 8/2008 Marushak
7,865,775 B2 1/2011 Yao
7,974,286 B2 7/2011 Keohane et al.
8,817,000 B1 8/2014 Sauvage
9,804,646 B2 10/2017 Jaussi
10,416,988 B1 9/2019 Kulchytskyy
2002/0095611 A1* 7/2002 Jochiong ............... G06F 1/3209 713/330
2003/0182577 A1 9/2003 Mocek
2008/0059720 A1 3/2008 Rothman
2008/0162952 A1 7/2008 Landers
(Continued)

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).
(Continued)

*Primary Examiner* — Phong H Dang
(74) *Attorney, Agent, or Firm* — WOMBLE BOND DICKINSON (US) LLP

(57) ABSTRACT

Methods and systems for managing a data processing system are disclosed. Peripheral devices connected to the data processing system may enter a state that requires one or more recovery actions to be performed to recover these peripheral devices. A management controller that operates independently of a data processing system may be provided within the data processing system to oversee and manage recovery of such peripheral devices. In particular, the management controller may cause these peripheral devices to perform one or more recovery actions that would not disrupt other, non-peripheral device related, operations of the data processing system.

20 Claims, 7 Drawing Sheets

(56) References Cited

U.S. PATENT DOCUMENTS

| | | | | |
|---|---|---|---|---|
| 2009/0132838 | A1* | 5/2009 | Cherian | G06F 1/3203 713/320 |
| 2010/0007473 | A1 | 1/2010 | Fadell | |
| 2011/0035526 | A1* | 2/2011 | Slaight | G06F 13/385 710/313 |
| 2011/0119686 | A1 | 5/2011 | Chen | |
| 2014/0195684 | A1 | 7/2014 | Taaghol | |
| 2014/0258526 | A1 | 9/2014 | Le Sant | |
| 2015/0287273 | A1* | 10/2015 | Panzarella | G07F 17/3223 463/25 |
| 2015/0304343 | A1 | 10/2015 | Cabrera | |
| 2015/0309559 | A1* | 10/2015 | Jacobson | G06F 15/177 713/330 |
| 2018/0011524 | A1 | 1/2018 | Stumpf | |
| 2018/0062395 | A1 | 3/2018 | Aldehayyat | |
| 2020/0044868 | A1 | 2/2020 | Vakulenko | |
| 2020/0097379 | A1* | 3/2020 | Truong | G06F 13/4063 |
| 2020/0218527 | A1 | 7/2020 | Ganesan | |
| 2020/0249736 | A1 | 8/2020 | Walker | |
| 2020/0257517 | A1* | 8/2020 | Seater | G06F 1/3206 |
| 2021/0042062 | A1 | 2/2021 | Betusno | |
| 2023/0008238 | A1* | 1/2023 | Mugunda | G06F 13/405 |
| 2023/0016507 | A1 | 1/2023 | Kodama | |
| 2023/0205248 | A1 | 6/2023 | Srivastav | |
| 2023/0315485 | A1 | 10/2023 | Paulraj | |
| 2023/0376575 | A1 | 11/2023 | Anzai | |
| 2024/0054039 | A1 | 2/2024 | Srinivasan | |
| 2024/0393858 | A1 | 11/2024 | Dai | |

OTHER PUBLICATIONS

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

* cited by examiner

MANAGEMENT AND RECOVERY OF DATA PROCESSING SYSTEM PERIPHERAL DEVICES

FIELD

Embodiments disclosed herein relate generally to data processing system management. More particularly, embodiments disclosed herein relate to systems and methods to manage and recover one or more peripheral devices installed within a data processing system.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
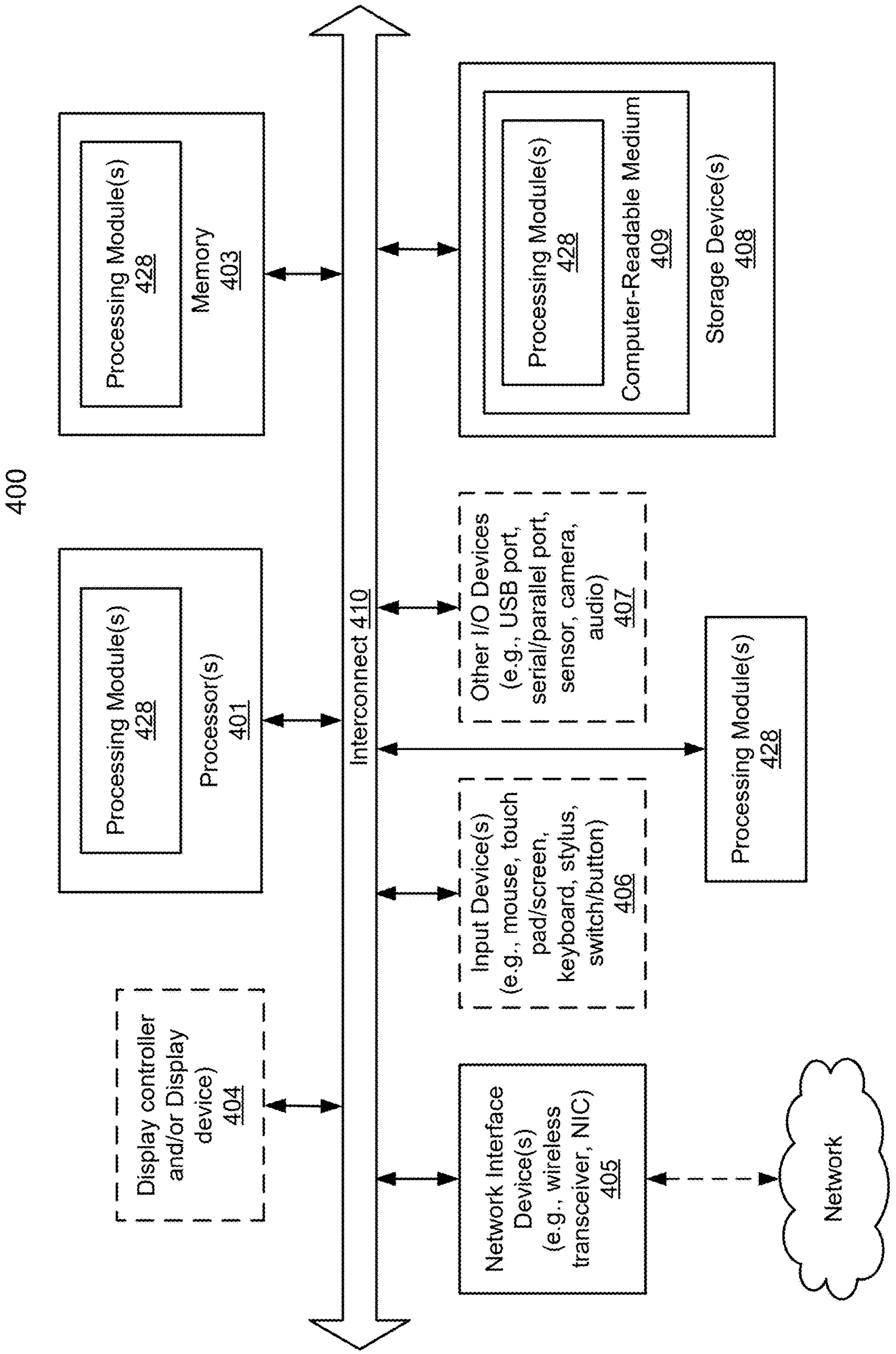
FIG. 4 shows a block diagram illustrating a computing device in accordance with one or more embodiments.

In general, embodiments disclosed herein relate to methods and systems for managing one or more peripheral devices connected to (e.g., installed within or externally connected to) a data processing system (such as computing devices, as described below in reference to FIG. 4). Peripheral devices may include any type of add-on and/or expansion components (namely, hardware components) such as channel cards (e.g., a fiber channel card, or the like), network interface cards (NICs), graphical processing units (GPU), data processing units (DPUs), digital signal processors (DSPs), or the like.

In one example, a peripheral device may be a radio access network (RAN) DPU. Such RAN DPUs may be cloud-based RAN devices that are crucial hardware components for enhancing telecom networking capabilities of a data processing system (e.g., a data processing system configured as a server or the like). Such RAN DPUs may be used in Cloud-RAN architectures that advantageously centralize radio access networks using cloud computing technology.

However, peripheral devices may fail due to hardware failure(s), software failure(s), or a combination of both. When such failure occurs, the failed peripheral devices are recovered through a power cycling (e.g., a reset or restart) of the entire data processing system. Such power cycling can disadvantageously result in sever and/or data center downtime while the data processing system is being power cycled, potentially causing unwanted disruptions to the Cloud-RAN architecture of which the data processing system service.

An abrupt power cycling of the data processing system may also cause unwanted disruption to other, non-peripheral device related, operations that are concurrently running on the data processing system, potentially resulting in issues such as data losses, data processing system hardware and/or firmware damage, loss of progress with ongoing (at time critical) workloads, or the like. Indeed, separate access to the peripheral devices by (or through) the data processing system itself to recover the peripheral devices without also affecting the data processing system (e.g., requiring power cycling of the data processing system) is unavailable.

Figure 1A:
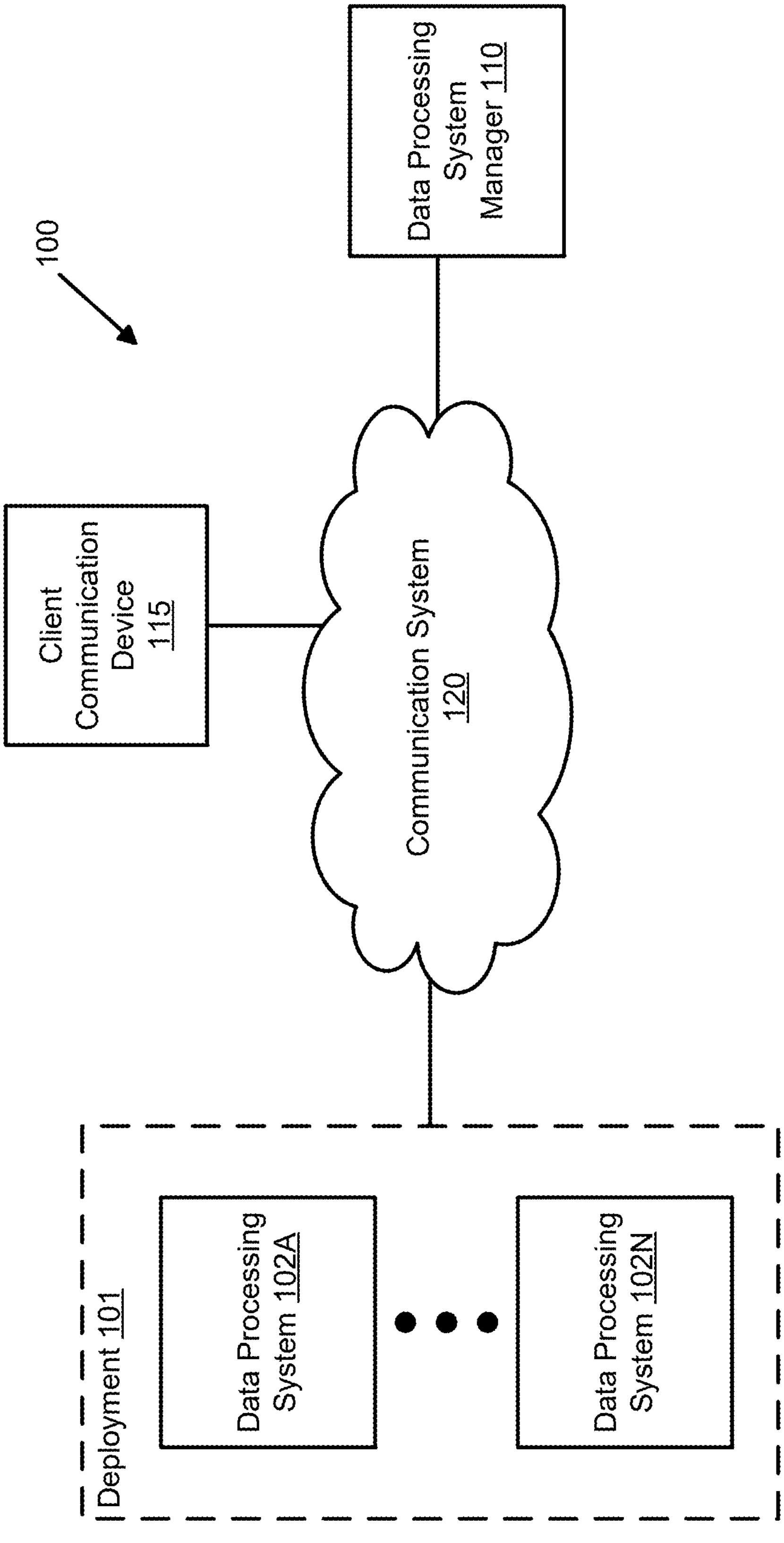
FIG. 1A shows a block diagram illustrating a system in accordance with one or more embodiments.
Figure 1B:
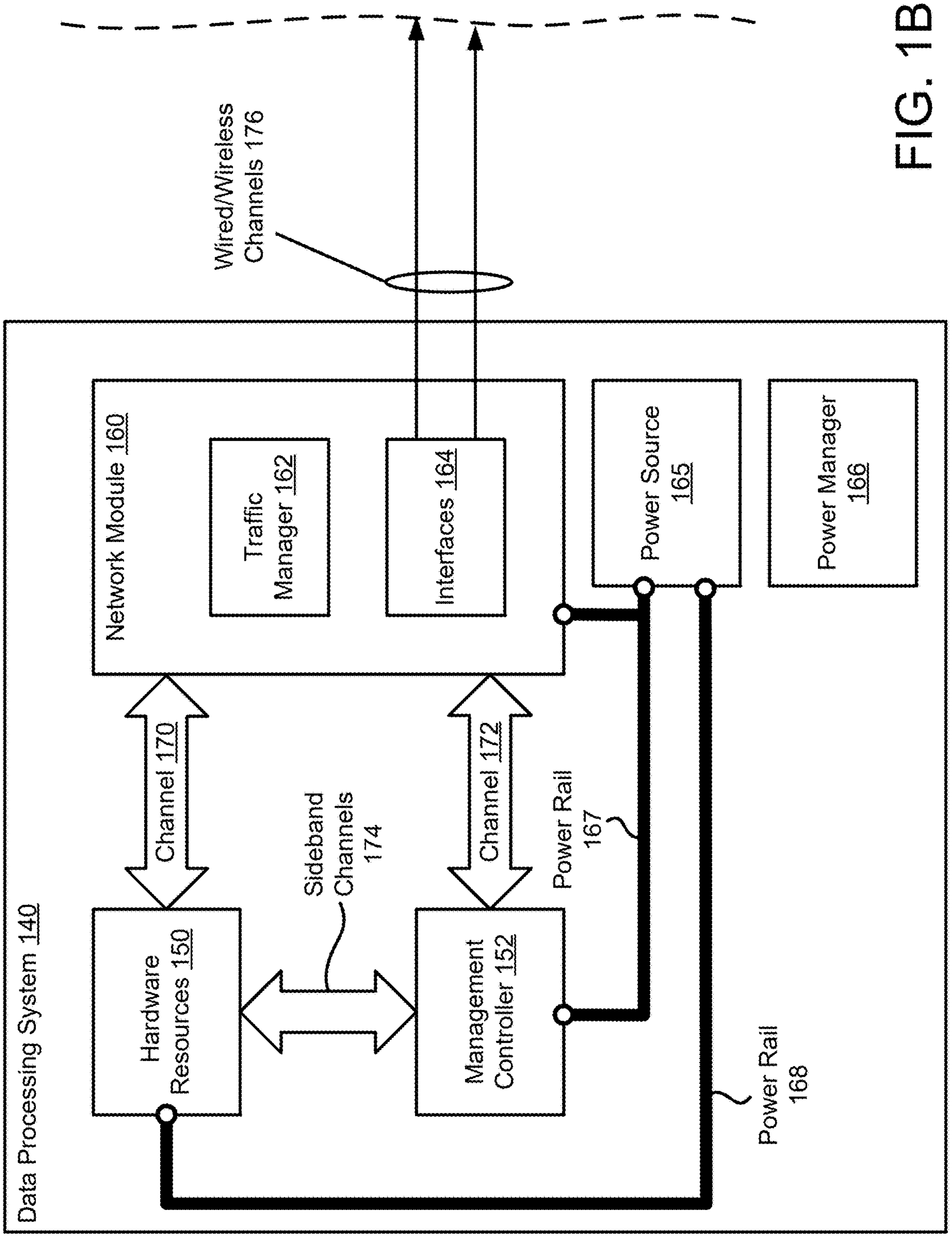
FIGS. 1B and 1C show a block diagram illustrating a data processing system in accordance with one or more embodiments.
Figure 1C:
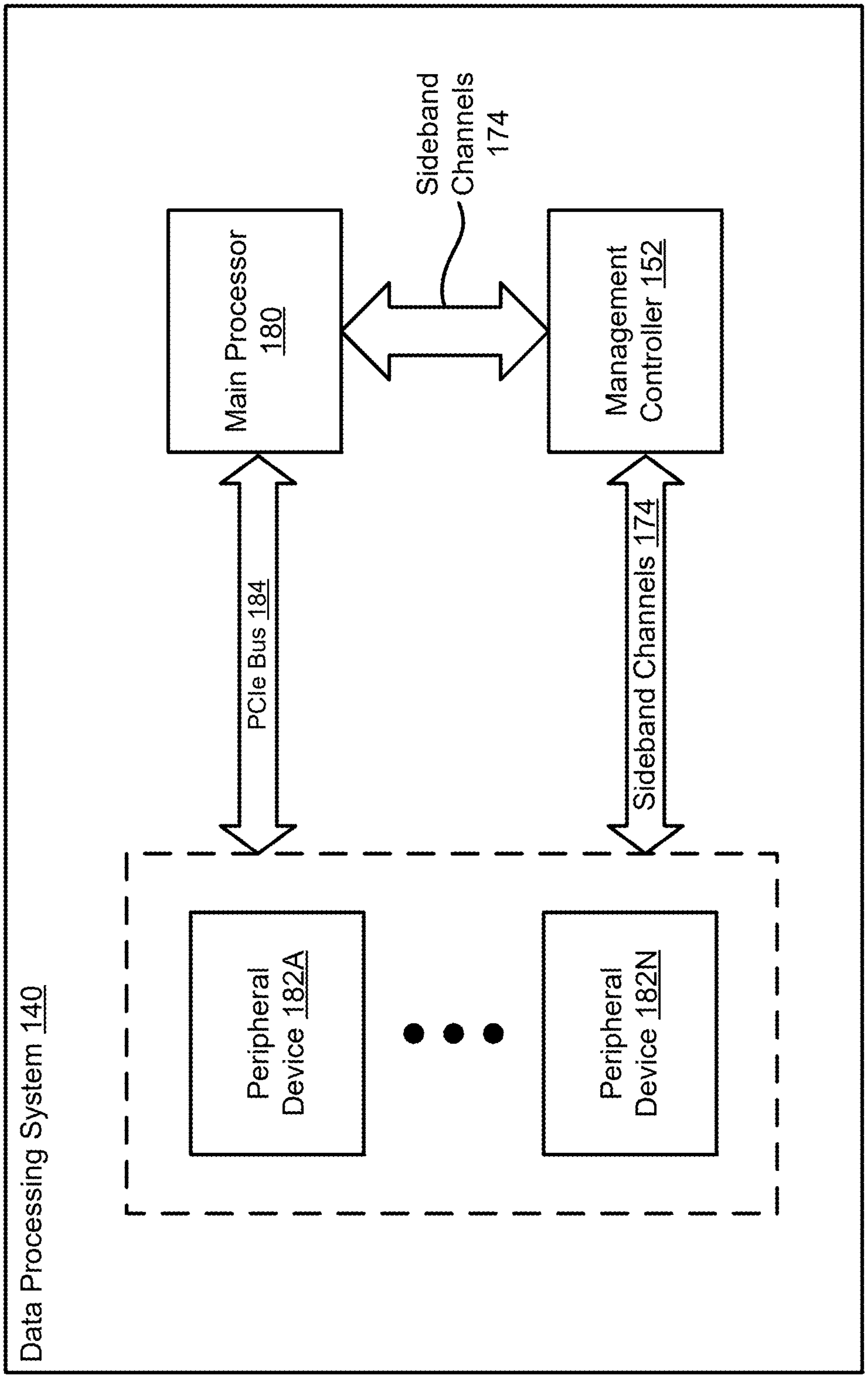
Figure 1D:
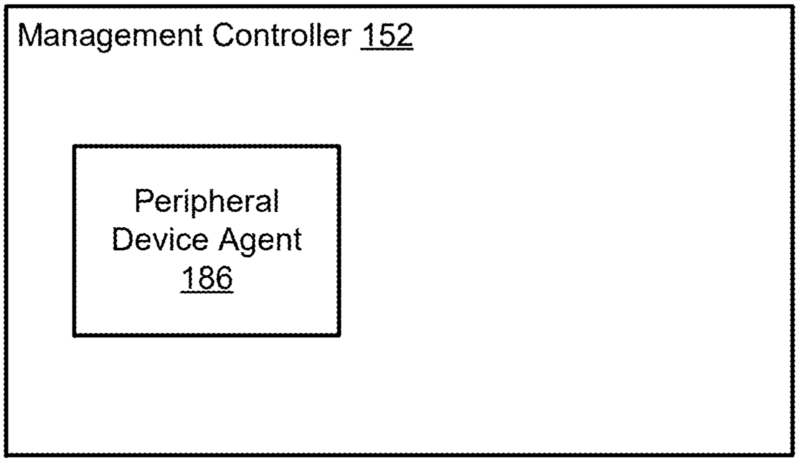
FIG. 1D shows a block diagram illustrating a management controller in accordance with one or more embodiments.

To resolve the above issues regarding recovery of peripheral devices without also affecting an entirety of the data processing system, a management controller (e.g., a baseboard management controller (BMC) in the form of a microcontroller, or the like as discussed in more detail before in reference to FIGS. 1B and 1D), may be installed within the data processing system to independently (from the data processing system) manage the peripheral devices.

In particular, although the management controller may also be installed within the data processing system, the management controller may be provided with and use its own limited computing resources (e.g., processing and storage resources or the like) that are separate and independent of the limited computing resources of the data processing system.

In embodiments, the management controller may also communicate with the peripheral devices via a separate channel from a communication channel between the data processing system and the peripheral devices. As a result, the management controllers may separately transmit instructions to the peripheral devices to cause the peripheral devices to initiate one or more actions (e.g., recovery-based actions, power management actions, or the like) without affecting an entirety of the data processing system.

Said another way, should a peripheral device fail, the management controller may manage and recover the failed peripheral device without causing a power cycling of the entire data processing system. This will be described below in more detail with reference to FIGS. 2 and 3. Thus, unwanted sever and/or data center downtime and unwanted disruptions to other, non-peripheral device related, operations that are concurrently running on the data processing system may advantageously be avoided.

As a result, embodiments disclosed herein may provide, among others, an improvement (e.g., a technical improvement) to the above-discussed issues regarding recovery of peripheral devices without also affecting an entirety of the data processing system. In particular, an improved mechanism, by way of the management controller providing a separate mechanism (which was previously unavailable) for accessing the peripheral devices, to communicate with and manage the peripheral devices connected to the data processing system.

Such improvements may also directly translate to an improvement to the functionalities (e.g., computer functionalities) of the data processing system itself. By preventing unwanted disruptions to the other, non-peripheral device related, operations that are concurrently running on the data processing system, limited computing resources of the data processing system can be more effectively used on these operations rather than being diverted to be used to recover (e.g., restart) these operations (and the data processing system itself) as a result of a power cycling of the data processing system from a restart or reset of a failed peripheral device.

In addition to the above, the management controller may also be configured to cause the peripheral devices to enter a low power mode when data centers and/or servers (e.g., embodied and/or made up by one or more data processing systems) are not operating at a high load. This further improves the functionalities of not only these data processing systems but also of the peripheral devices themselves as all of these devices and/or components can save energy (e.g., require less power consumption to operate) while the peripheral devices are set in the low power mode.

In an embodiment, a method for managing a data processing system is provided. The method may include: obtaining, by a management controller of a data processing system, a peripheral device management request, the peripheral device management request comprising one or more actions to be performed by a peripheral device connected to the data processing system without causing a power cycling of the data processing system; and causing, by the management controller, the peripheral device to perform the one or more actions without causing the power cycling of the data a processing system.

The management controller is a microcontroller installed within the data processing system that operates independently of a central processing unit (CPU) of the data processing system, and the peripheral device is a data processing unit (DPU).

Causing the peripheral device to perform the one or more actions may include, by the management controller: configuring a general-purpose input/output (GPIO) expander installed in the peripheral device to cause other components of the peripheral device connected to one or more output registers of the GPIO to perform the one or more actions.

The other components of the peripheral device comprise a system on a chip (SoC) capable of causing the peripheral device to enter a low power operating mode.

The CPU communicates with the peripheral device via a first communication interface and the management controller communicates with the peripheral device via a second communication interface different from the first communication interface.

The first communication interface comprises a peripheral component interconnect express (PCIe) bus and the second communication interface comprises an inter-integrated circuit (i2c) communication channel or a PCIe vendor defined messaging (VDM) channel.

The one or more actions comprises actions selected from a group consisting of: resetting or restarting the peripheral device; switching between two or more firmware hosted on the peripheral device; and switching the peripheral device to a low power mode.

A non-transitory media may include instructions that when executed by a processor cause the computer-implemented method to be performed.

A management controller of a data processing system may include the non-transitory media and a processor, and may perform the computer-implemented method when the processor executes the instructions in the non-transitory media.

Turning to FIG. 1A, a block diagram illustrating a system 100 in accordance with an embodiment is shown. The system 100 shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 102A-102N. Data processing systems 102A-102N may provide the computer implemented services to users of data processing systems 102A-102N and/or to other devices (not shown). Different data processing systems 102A-102N may provide similar and/or different computer implemented services. These data processing systems 102A-102N may be organized in one or more deployments 101 (e.g., server farms, remote storage environments, Cloud-RAN deployments, or the like) to collectively provide the computer implemented services.

To provide the computer implemented services, data processing systems 102A-102N may include various hardware components (e.g., processors, memory modules, storage devices, peripheral devices, etc.) and host various software components (e.g., operating systems, application, startup managers such as basic input-output systems, etc.). These hardware and software components (discussed in more detail below in FIG. 1B) may provide the computer implemented services via their operation.

The software components may be implemented using various types of services. For example, each data processing system of the data processing systems 102A-102N may host various services that provide the computer implemented service (e.g., application services) and/or that manage the operation of these services (e.g., management services). The aggregate (e.g., combination) of the management and application services may be a complete service that provide desired functionalities.

To manage the data processing systems 102A-102N, the system of FIG. 1A may include data processing system manager 110. Data processing system manager 110 may include various hardware components (e.g., processors, memory modules, storage devices, peripheral devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 102A-102N to communicate with and manage (namely, the components installed within) the data processing systems 102A-102N.

The system of FIG. 1A may also include a client communication device 115. The client communication device 115 may be any type of computing device (e.g., computing device of FIG. 4) owned by a user of any of the data processing systems 102A-102N. More specifically, the client communication device 115 may be a computing device used by a user of a data processing system (e.g., data processing system 102A) to communicate with the data processing system manager 110 whenever the user wishes to configure (e.g., manage, make a change to, or the like) the data processing system 102A (or any of the other data processing systems) including any software and/or hardware components of the data processing system 102A (e.g., peripheral devices connected to the data processing system 102A or the like). For example, the client communication device 115 may be the user's work laptop or desktop computer, a tablet computer, a smartphone, or even any of the data processing systems 102A-102N (e.g., the client communication device 115 may be the data processing system 102A itself that the user wishes to configure and/or manage).

In embodiments, the client communication device 115 and/or the data processing system manager 110 may also communicate directly with a management controller (discussed in more detail below in FIGS. 1B and 1D) installed within any of the data processing systems 102A-102N. Such communications may be available through one or more application-based services (e.g., application programming interface (API) based services such as Dell®'s Redfish API or the like) providing wireless communication capabilities (e.g., through web servers and/or services, or the like). Each of the client communication device 115 and/or the data processing system manager 110 may also be provided with a BMC graphical user interface (GUI) for receiving inputs (e.g., commands, files, and other type of data) from a user to be communicated to the management controller. Other types of communication interfaces, protocols, and/or channels (including command line interfaces (CLI) or the like) may also be used to facilitate communication between the management controller and the client communication device 115 and/or the data processing system manager 110 without departing from the scope of embodiments disclosed within.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Turning to FIG. 1B, a diagram illustrating data processing system 140 in accordance with an embodiment is shown. Data processing system 140 may be similar to any of the data processing systems (e.g., any one of data processing systems 102A-102N) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components. These hardware resources 150 (in addition to network module 160, management controller 152, power source 165, power manager 166, and the other components shown in FIG. 1B) may be the default hardware components that are included in the data processing system 140 by a manufacturer of the data processing system 140. However, it could be appreciated that the default hardware components may include more (or less) of what is shown in FIG. 1B.

The processor (e.g., a central processing unit (CPU) chip installed on a motherboard, or the like) may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a data processing system 140). For example, management controller 152 may be a baseboard management controller (BMC), or the like.

Management controller 152 may provide various management functionalities for data processing system 140. For example, management controller 152 may monitor various ongoing processes performed by the in-band component, may manage power distribution, thermal management, and/or other functions of data processing system 140. To conduct such monitoring and provide such functions, the management controller 152 may include its own processor (e.g., a second processor separate and operating independently from the main processer of the data processing system).

Additionally, management controller 152 may be operably connected to various components via sideband channels 174 (in FIG. 1B, a limited number of sideband channels are included for illustrative purposes, it will be appreciated that management controller 152 may communication with other components (including peripheral devices installed within the data processing system 140) via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Said another way, as long as the data processing system is connected to a power source (e.g., a batter, a wall outlet, a generator, or the like), management controller 152 may still be powered on and operational while the data processing system itself is in a powered off (e.g., shut down/shut off) state. More specifically, turning off the data processing system 140 (e.g., via a shutdown command) does not also turn off the management controller 152.

To implement the separate power domains, data processing system 140 may include a power source (e.g., 165) that separately supplies power to power rails (e.g., 167, 168) that power the respective power domains. Power from the power source (e.g., one or more power supplies, batteries, or other types of PSUs etc.) may be selectively provided to the separate power rails to selectively power the different power domains. A power manager (e.g., 166) may manage power from power source 165 that is supplied to the power rails. Management controller 152 may cooperate with power manager 166 to manage supply of power to these power domains.

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

In addition to the components (e.g., hardware resources 150, network module 160, management controller 152, power source 165, power manager 166, power rails 167-168, components making up channels 170-172 and sideband channels 174, etc.) additional hardware components (e.g., peripheral devices) (not shown in FIG. 1B) may be installed within (or externally to) the data processing system 140.

In embodiments, these peripheral devices may include channel cards (e.g., a fiber channel card, or the like), network interface cards (NICs), graphical processing units (GPU), data processing units (DPUs), digital signal processors (DSPs), or the like and may communicate with the existing components of the data processing system 140 via various interfaces (e.g., one or more Peripheral Component Interconnect Express (PCIe) buses, universal serial buses (USB), or the like).

These peripheral devices may also draw power from the power source 165 in order to provide their functions (e.g., may be powered entirely, or in part, by power supplied from the power source 165 of the data processing system 140). To perform their functionalities, these peripheral devices may also use the limited computing resources of any of the main processor of the data processing system 140 and/or the processor of management controller 152.

Turning to FIG. 1C, a diagram illustrating an example architecture between the main processor, management controller 152, and peripheral devices of the data processing system 140 is shown. As shown in FIG. 1C, the same data processing system 140 is now shown to include (for exemplary purposes only) just the main processor (e.g., in the form of main processor 180 that includes the basic input/output system (BIOS) (namely, a startup manager) of the data processing system 140), management controller 152, and one or more peripheral devices 182A-182N.

Each of the peripheral devices 182A-182N may be an add-on and/or expansion component (namely, hardware component) such as channel cards (e.g., a fiber channel card, or the like), network interface cards (NICs), graphical processing units (GPU), data processing units (DPUs) (e.g., RAN-DPUs, or the like), digital signal processors (DSPs), or the like. Each of the peripheral devices 182A-182N may include its own processor (namely, a third processor separate from the main processor(s) of the data processing system 140 and the (second) processor(s) of the management controller 152) and its own memory (separate from that of the data processing system's 140 and that of the management controller's 152) storing the peripheral devices' firmware or the like.

As shown in FIG. 1C and discussed above in reference to FIG. 1B, the management controller 152 communicates (e.g., exchanges data) with the main processor 180 via sideband channels 174. The main processor 180 in turn is connected to and communicates (e.g., exchanges data) with the peripheral devices 182A-182N using physical communication bus(es) such as one or more PCIe Buses 184. Other types of physical communication bus(es) besides PCIe Bus 184 (or even virtual connections) may be used depending on the default communication interface(s) and/or connection interface(s) of the peripheral devices 182A-182N without departing from the scope of embodiments disclosed herein.

As further shown in FIG. 1C, the management controller 152 may be connected to and communicate (e.g., exchanges data) with the peripheral devices 182A-182N via sideband channels 174 that are different from the PCIe Bus 184 (and/or the other communication bus(es) connecting the main processor 180 to the peripheral devices 182A-182N). Such sideband channels 174 may be configured using physical and/or virtual paths (e.g., connections) between the management controller 152 and the peripheral devices 182A-182N. For example, such sideband channels 174 may be composed of PCIe buses (or other appropriate communication bus(es)) separate from the ones that connect the startup manager to the peripheral devices 182A-182N. Such sideband channels 174 may also be implemented using inter-integrated circuit (i2c) based communication channels, interfaces, and/or protocols. Even further, such sideband channels 174 may also be implemented using a PCIe vendor defined messaging (VDM) channel.

Other types of communication interfaces, channels, and/or protocols not described above may also be used as the sideband channels 174 without departing from the scope of embodiments disclosed herein.

For example, assume that there is only a single peripheral device 182A within the data processing system 140. Further assume that this single peripheral device 182A is connected to the main processor 180 via a PCIe bus (i.e., a first PCIe bus). Even further assume that the management controller 152 is also connected to the single peripheral device via a PCIe bus (i.e., a second PCI bus). In this example, the first PCIe bus would be a completely separate and distinct component (e.g., hardware component) from the second PCIe bus. Said another way, in this example, there would be two separate PCIe buses (e.g., two communication interfaces) that each respectively (and separately) connects the main processor 180 and the management controller 152 to the single peripheral device 182A. More specifically, albeit the same type(s) of communication medium(s) being used, the main processor 180 and the management controller 152 do not share the same communication medium(s) (e.g., the communication interface(s)) themselves and communication path(s) to communicate with the peripheral devices 182A-182N.

As a result, the management controller 152 may advantageously obtain (e.g., retrieve, receive, or the like) data from and issue commands (i.e., instructions) to the peripheral devices 182A-182N without ever having to go through (e.g., utilize) the main processor 180 of the data processing system 140.

Turning now to FIG. 1D, a diagram illustrating an example of a management controller 152 of data processing system 140 in accordance with an embodiment is shown. As shown in FIG. 1C, the management controller 152 may include a peripheral device agent 186.

In embodiments, peripheral device agent 186 of the management controller may be implemented using hardware, software, or a combination of both. The peripheral device agent may be configured 186 to perform any and all of the operations discussed below in reference below to FIGS. 2 and 3.

In particular, as part of its capabilities, the peripheral device agent 186 may receive communications from any of the data processing system manager 110 and/or the client communication device 115 of FIG. 1A. These communications may include one or more actions to be implemented (e.g., performed, executed, or the like) by one or more of the peripheral devices 182A-182N connected to the data processing system 140.

The peripheral device agent 186 may also utilize protocols such as Management Component Transport Protocol (MCTP) (e.g., via a combination of a MCTP driver with access to an i2c library, or the like), or the like, to communicate with the peripheral devices 182A-182N via the sideband channels 174 connecting the management controller 152 to the peripheral devices 182A-182N. More specifically, the peripheral device agent 186 may communicate with the peripheral devices 182A-182N to configure one or more general purpose input/output (GPIO) expanders (discussed below in FIG. 1E) installed in the peripheral devices 182A-182N.

Figure 1E:
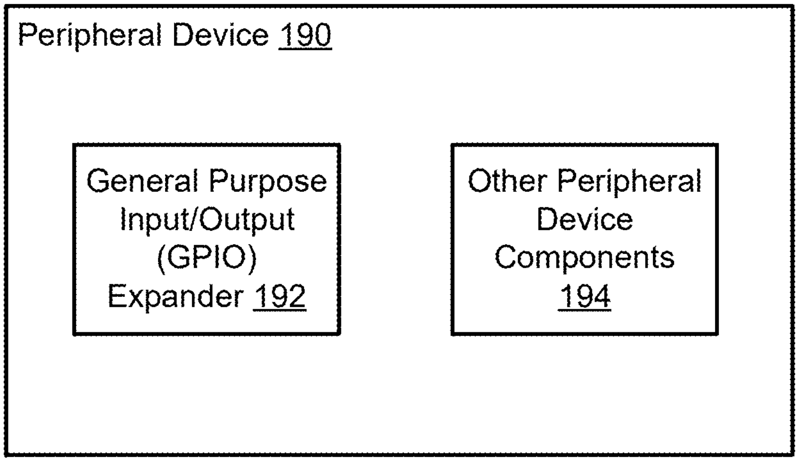
FIG. 1E shows a block diagram illustrating a peripheral device in accordance with one or more embodiments.

Turning now to FIG. 1E, a diagram illustrating an example of a peripheral device 190 of data processing system 140 in accordance with an embodiment is shown. The peripheral device 190 may be any of the peripheral devices 182A-182N discussed above in reference to FIG. 1C. As shown in FIG. 1E, the peripheral device 190 may include a GPIO expander 192 and other peripheral device components 194. Each of these components will be described as follows.

In embodiments, the GPIO expander 192 may be computer hardware (e.g., a port expander) that allows more than one component of the peripheral device 190 (e.g., the other peripheral device components 194) to be connected to a single port of the peripheral device 190 (e.g., a port connected to and in communication with the management controller 152). The GPIO expander 192 may include any number of channels. The GPIO expander may also be an i2c controlled GPIO expander. Other types of GPIO expanders may be used without departing from the scope of embodiments disclosed herein.

The other peripheral device components 194 may include other hardware components of the peripheral device 190 including, but not limited to: a system on a chip (SoC) of the peripheral device 190, memory (e.g., flash memory) of the peripheral device 190, or the like. The SoC may include the processor of the peripheral device 190. The memory may store firmware of the peripheral device 190.

In embodiments, the peripheral device 190 may include any number of memory storing any number of (identical or different) firmware. For example, the peripheral device 190 may have a first flash memory storing a piece of firmware and a second flash memory (as back up) storing an identical piece of firmware. In this example, when the first flash memory fails or when the firmware in the first flash memory becomes corrupted, the second flash memory storing the identical copy of the firmware may be used as a redundancy policy to keep the peripheral device 190 in operation.

The other peripheral device components 194 may include other hardware components besides the SoC and the memor (ies) discussed above without departing from the scope of embodiments disclosed herein.

Figure 2:
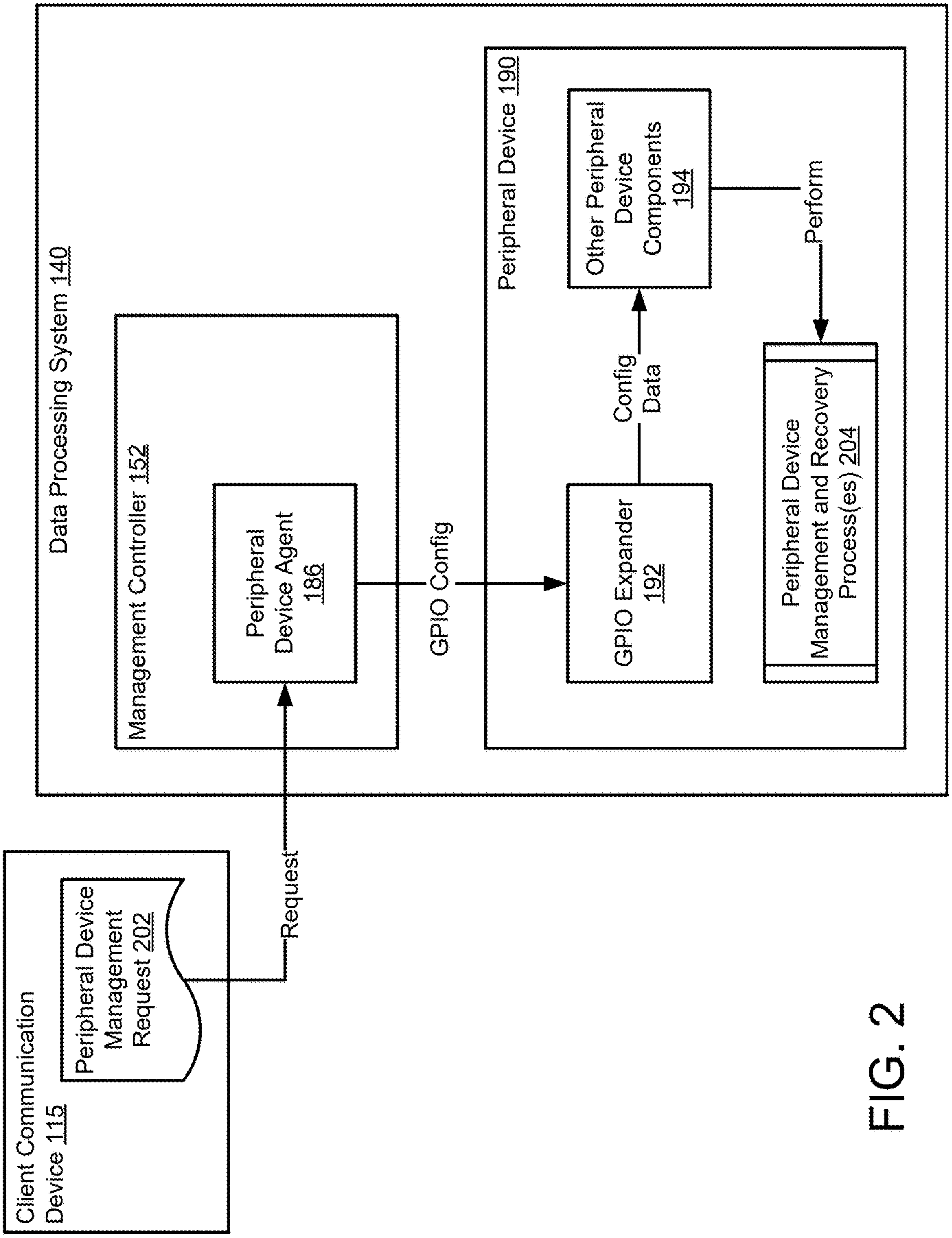
FIG. 2 shows a data flow diagram in accordance with one or more embodiments.

To further clarify embodiments disclosed herein, a data flow diagram in accordance with one or more embodiments disclosed herein is shown in FIG. 2. In this diagram, flows of data and processing of data are illustrated using different sets of shapes. A first set of shapes (e.g., 202, etc.) is used to represent data structures (e.g., files, data packets, or the like), a second set of shapes (e.g., 204, etc.) is used to represent processes performed using and/or that generate data, and a third set of shapes (e.g., 115, 140, 152, 190, etc.) is used to represent the components (e.g., the devices, hardware and/or software components, or the like discussed above in reference to FIGS. 1A-1E) that perform the processes shown using the second set of shapes.

Although the data flow diagram in FIG. 2 will be described specifically with regard to the use of a client communication device 115 for communicating with management controller 152 of data processing system 140, embodiments disclosed herein is not limited to only this configuration. In particular, the client communication device 115 may be substituted out for either the main processor 180 of the data processing system 140 or the data processing system manager 110 without departing from the scope of embodiments disclosed herein.

As shown in FIG. 2, a client communication device 115 may obtain a peripheral device management request 202 from a user. The peripheral device management request 202 may specify one or more actions (e.g., recovery-based, management-based, or the like, actions) to be performed by peripheral device 190 of the data processing system 140.

The client communication device may provide (e.g., transmit) the peripheral device management request 202 to the management controller 152 of the data processing system. In particular, the peripheral device management request 202 is provided to the peripheral device agent 186 of the management controller 152.

As a non-limiting example, the peripheral device management request 202 may be sent to the management controller 152 using an API-based service through one or more web clients. More specifically, the peripheral device management request 202 may be sent over a secure web connection through Hypertext Transfer Protocol Secure (HTTPS). An API (or similar service) running in the management controller 152 may validate an authorization and/or authentication of the user that generated the peripheral device management request 202. After successful validation, the API (or similar service) running on the management controller 152 forwards the peripheral device management request 202 to the peripheral device agent 186.

Embodiments disclosed herein are not limited to this specific example for the transmission and reception of the peripheral device management request 202, and other transmission and reception protocols and techniques may be used without departing from the scope of embodiments disclosed herein. Additionally, any type of authorization and/or authentication techniques, processes, and/or protocols may be used to validate the user that generated the peripheral device management request 202.

Once the peripheral device agent 186 has received the peripheral device management request 202, the peripheral device agent 186 may identify the peripheral device 190 included in the peripheral device management request 202 (e.g., discover a physical location of the peripheral device 190 within the data processing system 140).

For example, the peripheral device agent 186 may discover the peripheral device 190 using MCTP and identify an i2c bus number of the peripheral device 190 using an address resolution protocol (ARP). Other discovery methods may also be used by the peripheral device agent 186 without departing from the scope of embodiments disclosed herein.

Once the peripheral device agent 186 discovers peripheral device 190, the peripheral device agent 186 may use the contents of (e.g., the instructions and/or information included within) the peripheral device management request 202 to configure the GPIO expander 192 of the peripheral device 190 (e.g., by sending the configurations as the GPIO config shown in FIG. 2 to the GPIO expander 192). Once the GPIO expander 192 receives the GPIO config, the GPIO expander may forward the configuration data (Config Data in FIG. 2) to the other peripheral devices components 194 to cause the other peripheral devices components 194 to perform one or more actions (as specified in the peripheral device management request 202) as part of peripheral device management and recovery process(es) 204. This advantageously allows users of the data processing system 140 to directly talk to and control (e.g., manage) the peripheral device 190 without having to go through the data processing system 140 itself (e.g., the main processor 180 of the data processing system 140), which also creates a new (previously unavailable) communication channel between the user and the peripheral device 190.

For example, the GPIO expander 192 (namely, the output pins of the GPIO expander 192) may be connected to one or more input/output (I/O) pins of the SoC making up the other peripheral device components 194 of the peripheral device 190. In particular, the GPIO expander 192 output pins may be configured to select, for example, boot methods of the peripheral device 190 (e.g., through connection to one or more boot method pins of the SoC of the peripheral device). Additionally or alternatively, the configuration registers of the GPIO expander 192 may be set based on different types of actions to be implemented by the SoC such as, for example: a cold reset, a warm reset, boot method selection, firmware selection, or the like.

Continuing with the example, based on the instructions included in the peripheral device management request 202, the peripheral device agent 186 may frame an i2c packet to include configurations consistent with the instructions and provide the i2c packet to the SPIO expander 192 via the sideband channels (e.g., 174, FIGS. 1B and 1C) connecting the management controller 152 to the peripheral device 190.

In embodiments, the one or more actions included as instructions in peripheral device management request 202 (and to be performed as the other peripheral device components 194 as part of peripheral device management and recovery process(es) 204) may include, for example: resetting or restarting the peripheral device 190; switching between two or more firmware hosted on the peripheral device 190; and switching the peripheral device 190 to operate on a low power mode.

In particular, in one example, assume that the peripheral device 190 has two memories (e.g., flash memories) each storing identical instances of firmware required for the peripheral device 190 to operate. Further assume that a first memory of the two memories has failed or the instance of the identical firmware stored in the first memory has become corrupted. Assume even further that the second memory and the instance of the identical firmware stored in the second memory are both healthy. To recover the peripheral device 190 (from the failure associated with the first memory), the peripheral device management request 202 may include instructions for causing the SoC of the peripheral device (that is currently using the first memory) to switch to using the first memory to the second memory. Such a switch performed through the management controller 152 to recover the peripheral device 190 may advantageously not require a power cycling of an entirety of the data processing system 140. Thus, other, non-peripheral device related, operations that are concurrently running on the data processing system will advantageously not be disrupted and the data processing system (and other data processing systems connected to the data processing system) will similarly not experience any non-peripheral device related services downtime.

As another example, assume a situation where the peripheral device 190 enters a state where it needs to be reset or restarted. Through this process discussed in FIG. 2, the management controller 152 may cause the other peripheral device components 194 (through configuration of the GPIO expander 192) to perform any type of reset required (e.g., a warm reset, a cold reset, or the like) as part of peripheral device management and recover process(es) 204. Such a reset or restart of the peripheral device 190 through the management controller again advantageously does not require a power cycling of the entirety of the data processing system 140.

Similarly, as yet another example, assume a situation where the user wishes for the peripheral device 190 to enter a low power mode when the data processing system is experiencing idle time (e.g., low computing workload requiring use of the peripheral device). Through this process discussed in FIG. 2, the management controller 152 may cause the SoC of the peripheral device 190 (through configuration of the GPIO expander 192) to enter the low power mode to save power (e.g., energy resources) of the data processing system.

Other types of actions (to be implemented by the peripheral device) may also be included without departing from the scope of embodiments disclosed herein.

In embodiments, once the peripheral device 190 has been caused by the management controller 152 to perform the one or more actions (e.g., recovery-based, management-based, or the like, actions), the management controller 152 may collect data (e.g., telemetry data, operation data, or the like) from the peripheral device 190 to determine whether the peripheral device 190 has successfully implemented the actions (e.g., has been successfully recovered in the case of a failure, or the like).

In the event the management controller 152 determines that a reset or restart of the peripheral device 190 (or a switch between various available firmware stored on the peripheral device) fails to recover operations of the peripheral device 190, the management controller 152 may provide instructions to the client communication device 115 (or any other source of the peripheral device management request 202) to notify the user (e.g., via displaying a notification on a display or the like) that the peripheral device 190 cannot be recovered via a reset or restart and that additional user intervention (e.g., a complete part replacement) may be required.

Any of the processes illustrated using the second set of shapes (shown in FIG. 2) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Figure 3:
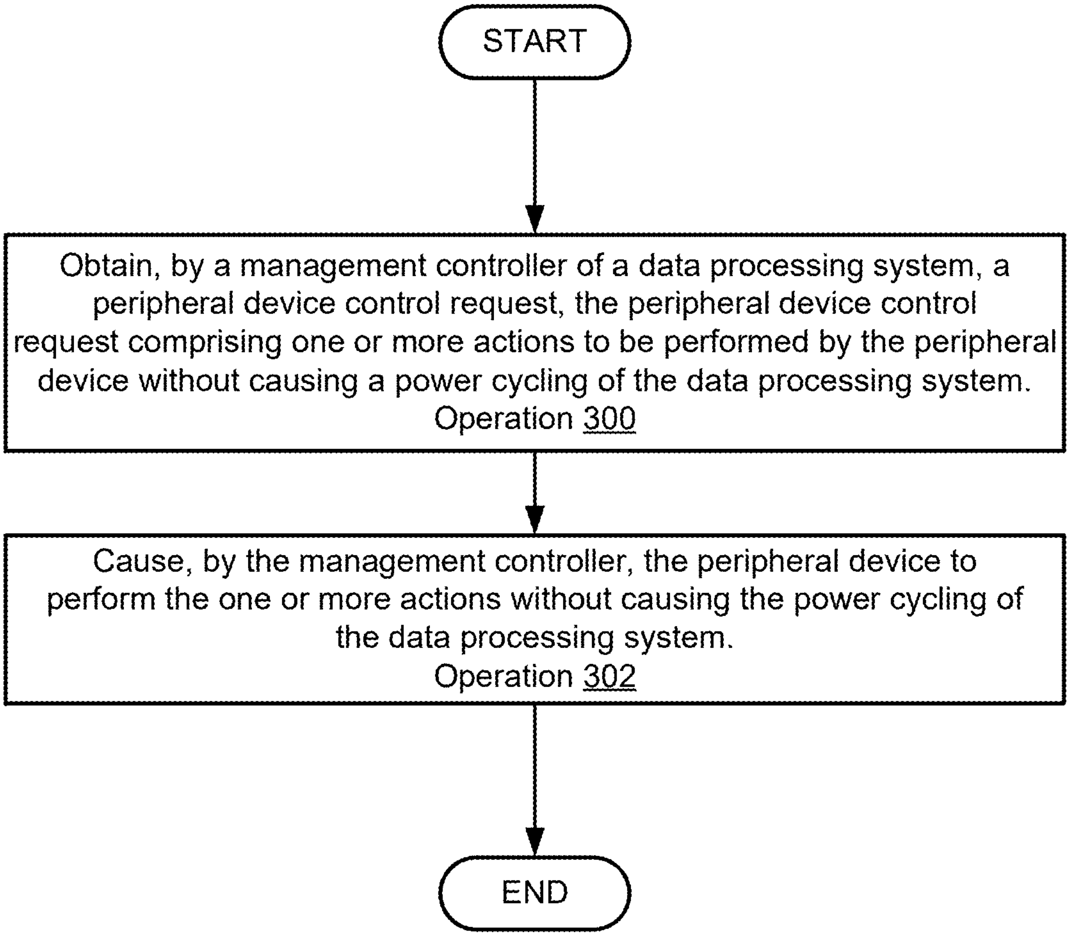
FIG. 3 shows a flowchart in accordance with one or more embodiments.

As discussed above, the components of FIGS. 1A-2 may perform various methods for managing a boot up process of a data processing system. FIG. 3 illustrate an example method that may be performed by the components of FIGS. 1A-2. For example, any of the data processing systems 102A-102N, the data processing system manager 110, and/or the client communication device 115 shown in FIG. 1A may perform all or a portion of the methods. In the diagram discussed below and shown in FIG. 3, any of the operations may be repeated, performed in different orders, and/or performed in parallel with or in a partially overlapping in time manner with other operations.

Starting with Operation 300 of FIG. 3, as discussed above in reference to FIG. 2, a management controller of a data processing system may obtain a peripheral device control request.

In embodiments, the peripheral device control request may include comprising one or more actions to be performed by the peripheral device without causing a power cycling of an entirety of the data processing system.

In Operation 302, as discussed above in reference to FIG. 2, the management controller may cause the peripheral device to perform the one or more actions without causing the power cycling of the entirety of the data processing system.

In embodiments, as part of causing the peripheral device to perform the one or more actions, the management controller (e.g., via a peripheral device agent 186) may configure a GPIO expander installed in the peripheral device to cause components of the peripheral device (e.g., a SoC of the peripheral device) connected to the GPIO expander to perform the one or more actions (e.g., resetting the peripheral device, restarting the peripheral device, changing a boot method of the peripheral device, causing the peripheral device to switch between various instances of firmware available in the peripheral device, causing the peripheral device to enter a low power mode, or the like.

The method of FIG. 3 may end following Operation 302.

Any of the components illustrated in FIGS. 1A-3 may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

obtaining, by a management controller of the data processing system, a peripheral device management request, the peripheral device management request comprising one or more actions to be performed by a peripheral device connected to the data processing system without causing a power cycling of the data processing system, the data processing system comprising a single network module that is shared by both of the management controller and hardware resources of the data processing system and that separately communicates with the management controller and the hardware resources using out-of-band channels for the management controller and in-band channels for the hardware resources;

performing, by the management controller and in response to obtaining the peripheral device management request, a discovery of the peripheral device using a Management Component Transport Protocol (MCTP) and information provided in the peripheral device management request, wherein the management controller obtains the peripheral device management request directly from a device remote to the data processing system via the single network module;

transforming, by the management controller and after discovering the peripheral device, the peripheral device management request into a general-purpose input/output (GPIO) configuration; and causing, by the management controller, the peripheral device to perform the one or more actions without causing the power cycling of the data processing system by:

configuring a GPIO expander installed in the peripheral device using the GPIO configuration to cause other components of the peripheral device connected to one or more output registers of the GPIO to perform the one or more actions.

2. The method of claim 1, wherein the management controller is a microcontroller installed within the data processing system that operates independently of a central processing unit (CPU) of the data processing system, the CPU being one of the hardware resources of the data processing system, and the peripheral device is a data processing unit (DPU).

3. The method of claim 2, wherein the other components of the peripheral device comprise a system on a chip (SoC) capable of causing the peripheral device to enter a low power operating mode.

4. The method of claim 2, wherein the CPU communicates with the peripheral device via a first communication interface and the management controller communicates with the peripheral device via a second communication interface different from the first communication interface.

5. The method of claim 4, wherein the first communication interface comprises a peripheral component interconnect express (PCIe) bus and the second communication interface comprises an inter-integrated circuit (i2c) communication channel or a PCIe vendor defined messaging (VDM) channel.

6. The method of claim 2, wherein the one or more actions comprise actions selected from a group consisting of: resetting or restarting the peripheral device; switching between two or more firmware hosted on the peripheral device; and switching the peripheral device to a low power operating mode.

7. The method of claim 1, wherein the single network module is further adapted to separately advertise network endpoints for the management controller and the hardware resources such that:

remote communications received by the network module and meant for the management controller never flow through the hardware resources first before reaching the management controller, and outgoing communications from the management controller to an entity remote to the data processing system never flow through any of the hardware resources.

8. The method of claim 1, wherein the peripheral device is physically connected to the data processing system.

9. The method of claim 8, wherein the one or more actions comprise switching the peripheral device to a low power operating mode via the management controller using the GPIO configuration to cause a processor or controller of the peripheral device to operate in the low power operating mode.

10. The method of claim 1, wherein the management controller and the network module are connected to a power supply of the data processing system via a first power rail that remains powered while a second power rail connecting the hardware resources to the power supply is unpowered such that the management controller and the network module remain operable while the hardware resources of the data processing system are powered off, the hardware resources comprising a CPU of the data processing system.

11. A non-transitory machine-readable medium having instructions stored therein, which when executed by a processor, cause the processor to perform operations for managing a data processing system, the operations comprising:

obtaining, by a management controller of the data processing system, a peripheral device management request, the peripheral device management request comprising one or more actions to be performed by a peripheral device connected to the data processing system without causing a power cycling of the data processing system, the data processing system comprising a single network module that is shared by both of the management controller and hardware resources of the data processing system and that separately communicates with the management controller and the hardware resources using out-of-band channels for the management controller and in-band channels for the hardware resources; and performing, by the management controller and in response to obtaining the peripheral device management request, a discovery of the peripheral device using a Management Component Transport Protocol (MCTP) and information provided in the peripheral device management request, wherein the management controller obtains the peripheral device management request directly from a device remote to the data processing system via the single network module;

transforming, by the management controller and after discovering the peripheral device, the peripheral device management request into a general-purpose input/output (GPIO) configuration; and causing, by the management controller, the peripheral device to perform the one or more actions without causing the power cycling of the data processing system by:

configuring a GPIO expander installed in the peripheral device using the GPIO configuration to cause other components of the peripheral device connected to one or more output registers of the GPIO to perform the one or more actions.

12. The non-transitory machine-readable medium of claim 11, wherein the management controller is a microcontroller installed within the data processing system that operates independently of a central processing unit (CPU) of the data processing system, the CPU being one of the hardware resources of the data processing system, and the peripheral device is a data processing unit (DPU).

13. The non-transitory machine-readable medium of claim 12, wherein the other components of the peripheral device comprise a system on a chip (SoC) capable of causing the peripheral device to enter a low power operating mode.

14. The non-transitory machine-readable medium of claim 12, wherein the CPU communicates with the peripheral device via a first communication interface and the management controller communicates with the peripheral device via a second communication interface different from the first communication interface.

15. The non-transitory machine-readable medium of claim 14, wherein the first communication interface comprises a peripheral component interconnect express (PCIe) bus and the second communication interface comprises an inter-integrated circuit (i2c) communication channel or a PCIe vendor defined messaging (VDM) channel.

16. The non-transitory machine-readable medium of claim 12, wherein the one or more actions comprise actions selected from a group consisting of: resetting or restarting the peripheral device; switching between two or more firmware hosted on the peripheral device; and switching the peripheral device to a low power operating mode.

17. A management controller of a data processing system, the management controller comprising:

a processor; and a memory coupled to the processor, the memory storing instructions that, when executed by the processor, causes the management controller to perform operations for managing the data processing system, the operations comprising:

obtaining a peripheral device management request, the peripheral device management request comprising one or more actions to be performed by a peripheral device connected to the data processing system without causing a power cycling of the data processing system, wherein the data processing system comprises a single network module that is shared by both of the management controller and hardware resources of the data processing system and that separately communicates with the management controller and the hardware resources using out-of-band channels for the management controller and in-band channels for the hardware resources;

performing, by the management controller and in response to obtaining the peripheral device management request, a discovery of the peripheral device using a Management Component Transport Protocol (MCTP) and information provided in the peripheral device management request, wherein the management controller obtains the peripheral device management request directly from a device remote to the data processing system via the single network module;

transforming, by the management controller and after discovering the peripheral device, the peripheral device management request into a general-purpose input/output (GPIO) configuration; and causing, by the management controller, the peripheral device to perform the one or more actions without causing the power cycling of the data processing system by:

configuring a GPIO expander installed in the peripheral device using the GPIO configuration to cause other components of the peripheral device connected to one or more output registers of the GPIO to perform the one or more actions.

18. The management controller of claim 17, wherein the management controller is a microcontroller installed within the data processing system that operates independently of a central processing unit (CPU) of the data processing system, the CPU is one of the hardware resources of the data processing system, the peripheral device is a data processing unit (DPU), and the one or more actions comprise actions selected from a group consisting of:

resetting or restarting the peripheral device; switching between two or more firmware hosted on the peripheral device; and switching the peripheral device to a low power operating mode.

19. The management controller of claim 18, wherein the other components of the peripheral device comprise a system on a chip (SoC) capable of causing the peripheral device to enter the low power operating mode.

20. The management controller of claim 19, wherein the CPU communicates with the peripheral device via a first communication interface and the management controller communicates with the peripheral device via a second communication interface different from the first communication interface.

* * * * *